Patented July 4, 1933

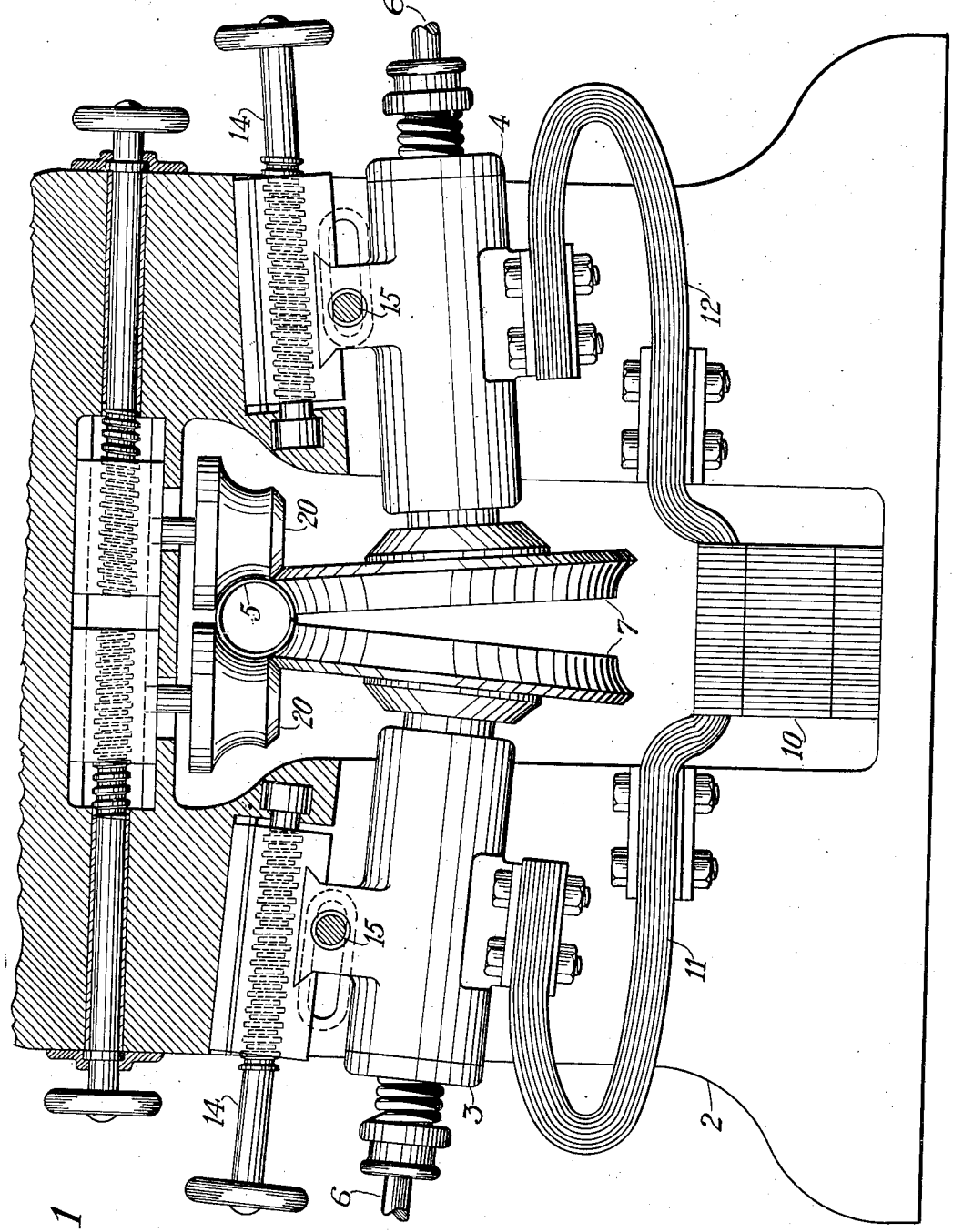

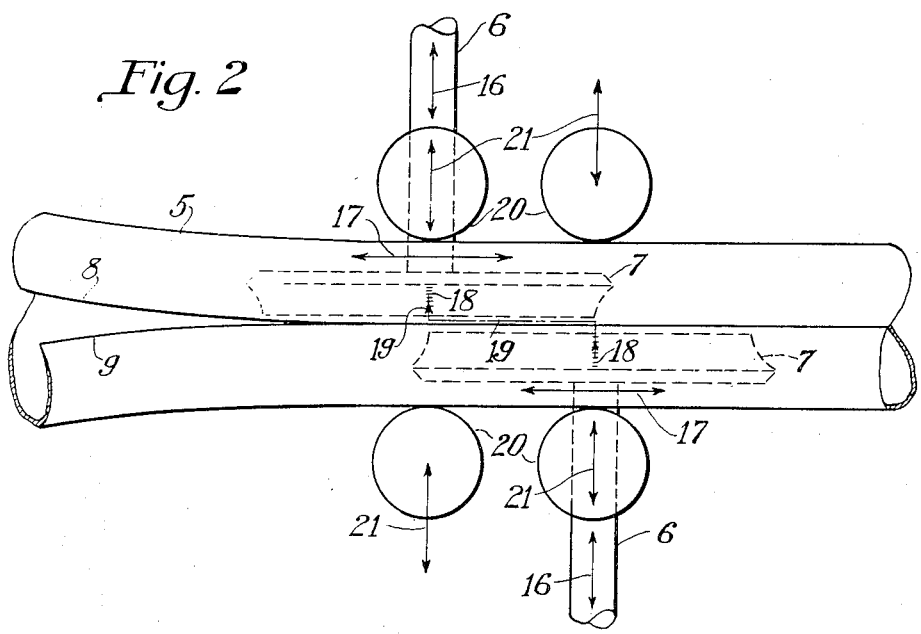

1,917,210

UNITED STATES PATENT OFFICE

JAMES L. ADAMS, JR., OF YOUNGSTOWN, OHIO, ASSIGNOR TO THE YOUNGSTOWN SHEET & TUBE COMPANY, OF YOUNGSTOWN, OHIO, A CORPORATION OF OHIO

ELECTRIC WELDING MACHINE AND METHOD OF WELDING

Application filed October 17, 1930. Serial No. 489,367.

The present invention relates to the art of electric welding, and more particularly to electric seam welding apparatus of the so-called roller contact type.

By reason of the simplicity of construction and operation of electrical welding apparatus utilizing contacts in the form of wheels or rolls, such apparatus has met with considerable favor. It is, however, open to certain serious objections as heretofore constructed. The contacts, which will hereinafter be referred to as circular contact rolls, have necessarily had a substantially line contact with the material being welded, regardless of whether such material was in the form of substantially flat pieces of metal, or curved, such as utilized for the formation of tubes, pipes or the like. Where the circular contact rolls have been placed directly opposite each other on opposite sides of the proposed line of weld, the two zones of substantially line contact characteristics have been directly opposite one to the other and have therefore afforded a current flow in a path at approximately right angles to the proposed line of weld. This path of cross seam current flow has also obviously been effective only in an extremely narrow path substantially commensurate with the effective width of the contact zones on either side of the seam, or perhaps some little in excess of this width since the current fans out somewhat before it reaches the seam.

Where the circular contact rolls have been supplied with alternating current of commercial frequency, and the material has been moved at anything like the speeds required to make the process a commercial one, the movement of the material has been such that the current flow zones produced by the successive alternations in the current supply have not overlapped one another completely as to their heating effect on the material. This has resulted in the production of a so-called "stitch" or discontinuous weld characterized by a series of small welded zones alternating with zones of unwelded or only partially welded metal. While material containing such a weld may be utilized for certain limited purposes, its field of use is obviously narrowly limited mechanically, it not being suitable for example, for the handling of gases or fluids under high pressure.

On the other hand, where such rotating circular contact rolls have been placed in series relation along the seam, with each roll contact bridging the latter, then the current flow zones produced by successive alternations of current, have overlapped one another satisfactorily, but the current flow has always been along and more or less close to the two edges of the material, over a path of diverging and then converging contour, but which at no time crosses the seam.

It has been found that unless the current is carried actually across the seam, there is a vastly inferior heating effect produced, with greatly lowered output possibilities, and decreased general efficiency in the use of the current.

It is, therefore, one of the objects of the present invention to provide circular rolling contacts in the form of rolls which are so positioned as to obviate the "stitch" effect, and still not subject the apparatus to the lowered heating efficiency of the tandem, or series roll disposition above referred to.

Another object of the present invention is to provide an apparatus by means of which it is possible to effect a continuous weld at a higher speed than has heretofore been considered feasible with apparatus of this general character without resorting to relatively higher frequencies.

In the accompanying drawings I have shown somewhat diagrammatically a preferred embodiment of my invention. In the drawings:

Figure 1 is a diagrammatic transverse sectional view through one form of apparatus constructed in accordance with the present invention, certain of the parts being illustrated in section while other parts are shown as slightly broken away or in elevation;

Figure 2 is a diagrammatic plan view illustrating the operation of the apparatus of Figure 1 certain features being exaggerated for clearness.

The present invention adapts itself to use with electrical welding apparatus of a wide variety of different types, and the specific details of construction of such apparatus generally constitute no part of the invention. Figure 1 shows one form of apparatus by means of which the invention may be practiced, this apparatus comprising a suitable frame 2 having bearings 3 and 4 on opposite sides of the longitudinal center line of the frame. These bearings are of generally similar construction, but are offset one from the other in a direction lengthwise of the material 5 which is being welded.

Extending through each bearing is a shaft 6 carrying on its end a circular contact roll 7 in engagement with the material being welded, on opposite sides of the proposed line of weld as defined by the edges 8 and 9 to be welded.

Mounted in the base of the frame is a transformer 10 having one of its leads 11, which is of flexible type, in electrical connection with the circular contact roll 7 in the bearing 3, and its other lead 12, which is of similar construction, in electrical connection with the circular contact roll 7 in the bearing 4. Since the present invention does not specifically pertain to the means for carrying heavy current from the stationary elements to the rotating parts, this very important element of design is not worked out in detail in the drawings, nor has means been shown for cutting down the air magnetic leakage between the rolls and the leads 7, 11 and 12, to the usual design value.

Each of the bearings is conveniently provided with means 14 whereby the bearings may be adjusted inwardly or outwardly toward or from the proposed line of weld. Similar means 15 is preferably also provided for adjusting the bearings in a direction generally parallel to the line of weld. In Figure 2, the inward and outward adjustability of the bearings is indicated by the arrows 16, while the lengthwise adjustment is indicated by the arrows 17.

It may be assumed that the bearings have been so adjusted as to bring the circular contact rolls into substantially the relationship illustrated in Figure 2. In this relationship, while lying on opposite sides of the seam line, they are longitudinally offset in a direction along the major axis of the material being welded, the circular contact rolls each having substantially a line contact 18 with the material 5. The respective line contacts, however, are offset lengthwise of the material whereby the instantaneous current flow may be considered as extending between these contacts in substantially the general direction indicated by the arrows 19 but with the customary well-known spreading out between the two rolls. From Figure 2 it will be apparent that this current flow is such that heating current is caused to travel lengthwise of the material through a very appreciable portion thereof, as distinguished from the almost linelike flow of circular contact rolls as heretofore utilized. This current flowing across the seam for a considerable length thereof effects the desired heating of a substantial portion of the seam, this portion being of such length as to insure overlapping of the heating effect of successive alternations, the amount of offset being regulated according to frequency of the welding current and the speed at which the material is fed. It will be apparent from the foregoing that I obtain the advantages of traveling contacts of the character constructed for movement with the material, without any of the disadvantages normally incident thereto.

For applying the necessary pressure to the material to effect the welding, I may provide any desired number of pressure rollers 20, each of which is preferably mounted for independent movement inwardly or outwardly in the direction indicated by the arrows 21. With such a construction I may either simultaneously utilize all of the various rollers, or any desired number thereof. Thus, in some cases I have found that certain advantageous results are obtained only by use of diagonally opposite pressure applying means, while in other cases I have found it necessary to apply opposed pressure throughout substantially the entire area of current flow such that the portions brought to welding temperature may be brought together under such conditions as to insure the formation of the desired weld.

The advantages of the present invention arise from the use of circular contact rolls each such as to provide substantially line contact with the material, and so disposed that the current flow between such line contacts is both transversely and longitudinally of the proposed line of weld.

While I have herein illustrated a preferred embodiment of the invention, and have described a preferred method of practicing same, it will be understood that the same may be otherwise carried out within the embodiment of my invention as set forth in the following claims.

I claim:

1. In the method of electric welding, the steps comprising providing a single linelike contact with the material on each side of and adjacent to the proposed line of weld, and maintaining said contact lines in spaced relation longitudinally of the material.

2. In a method of electric welding, the steps including feeding material continuously, and supplying alternating current from opposite terminals of a common supply circuit by contact to opposite sides of the seam to be welded, at points spaced along the path of material movement, whereby each point on the seam is subjected to the heating effect of a plurality of current alternations.

3. In a method of electric welding, the steps including feeding material continuously, and supplying alternating current thereto from opposite terminals of a common supply circuit by contact with opposite sides of the seam to be welded at points substantially spaced along the path of material movement, at a frequency such that, with a predetermined speed of the material and spacing of said points, a plurality of current alternations will be effective to heat each point on the seam.

4. A welding apparatus, comprising a pair of circular contact rolls on opposite sides of the proposed line of weld and spaced longitudinally of such line.

5. In a welding apparatus, means for supplying welding current to the work while the latter is moving, including contact rolls on opposite sides of the seam to be welded and spaced apart along the path of material movement, said rolls being connected to opposite terminals of a common current-supply circuit.

6. In a welding apparatus, a pair of substantially circular contact rolls, means for adjusting said contact rolls to engage the material to be welded with the rolls in different planes longitudinally of the material, and means for applying pressure to the material throughout any desired portion of the distance between said planes.

7. In a welding apparatus, a pair of substantially circular contact rolls, means for adjusting said contact rolls in a direction along the proposed line of weld to afford a longitudinally extending current flow path, and means for applying pressure to the material throughout the entire length of said path.

8 In the method of electric welding, the steps comprising maintaining a single line-like contact zone with the material to be welded on each side of the seam to be welded and adjacent thereto, with the zones on opposite sides of the seam separated in a direction longitudinally of the seam.

9. In the method of electric welding, the steps comprising providing a single localized contact zone with the material to be welded on each side of the seam to be welded, and maintaining the zones on opposite sides of the seam in closely adjacent relation to the seam and in longitudinally spaced relation lengthwise of the seam.

10. In a continuous electric welder for welding a longitudinal seam between butted plate edges, a single rotating current carrying contact roll effective for feeding welding current through substantially a line contact located transversely to and close to one side of the said seam, and a second similar single contact roll located on the opposite side of said seam but displaced a material distance along the seam from the axial line of said first mentioned roll so as to force welding current passing from one roll to the other to cross the seam over an appreciable zone lengthwise of the seam.

11. In a continuous electric welder for welding a longitudinal seam between butted plate edges, two rotating current carrying contact rolls with their axes of rotation substantially transverse to said seam and each effective for transmitting welding current from an appropriate source to the material on a line close to its own side of the seam only, and mounting means for supporting said rolls on opposite sides of said seam but well out of transverse-to-seam alinement one with the other to produce a concentrated current flow at the entrance to and exit from the material with a much broadened current flow across the seam.

12. In a continuous electric welder for welding a longitudinal seam between butted plate edges, two current carrying contact rolls having their axes of rotation transverse to the seam to be welded but located in definitely different transverse planes with respect to said seam and each engaging a single plate edge on its own respective side of the seam.

13. In a continuous electric welder for welding a seam between butted plate material edges, a single roll means for effecting a substantially line type welding current contact with the material transversely of and close to the seam to be welded, a similar single roll contact means located on the opposite side of the seam but in a definitely different transverse plane with respect to the first roll means, and means for varying the spacing between said transverse planes.

14. In a progressive electric welder for welding a seam between butted plate edges, a single roll contact for effecting welding current input close to one only of said edges along a substantially line contact transverse to said edge and located on one main surface of said plate, and a second single roll line type surface contact located on the opposite side only of the seam but in a definitely offset transverse plane from said first mentioned contact.

15. In a progressive electric welder for welding a longitudinal seam between butted plate material edges, a single roll contact for effecting welding current input close to one edge only of said plate along substantially a line contact transverse to the seam to be formed but on a main surface of the plate material, and a second moving contact located on the same main surface of the material but on the opposite side of said seam in definitely offset relation longitudinally of said seam with respect to said first mentioned contact.

16. In a continuous electric welder for welding a longitudinal seam between butted plate edges, a single rotating current carrying contact roll effective for feeding welding current through substantially a line contact located transversely to and close to one side of the said seam, a second similar single contact roll located on the opposite side of said seam but displaced a material distance along the seam from the axial line of said first mentioned roll so as to force welding current passing from one roll to the other to cross the seam over an appreciable zone lengthwise of the seam, and means for varying the spacing between said contact rolls in a direction along the seam.

In testimony whereof I have hereunto set my hand.

JAMES L. ADAMS, Jr.